United States Patent [19]

Hand

[11] 3,928,973
[45] Dec. 30, 1975

[54] PROCESS FOR EXTRACTING WATER AND ENERGY FROM SYNTHESIS GAS

[75] Inventor: John W. Hand, Aurora, Colo.
[73] Assignee: Mintech Corporation, Denver, Colo.
[22] Filed: Aug. 12, 1974
[21] Appl. No.: 496,637

[52] U.S. Cl. .......................... 60/648; 55/38; 55/70
[51] Int. Cl.² .......................................... F01K 25/06
[58] Field of Search .......... 261/22, 24; 60/643, 645, 60/648, 649, 650, 651, 670, 671, 673; 55/38, 70

[56] References Cited
UNITED STATES PATENTS

| | | | |
|---|---|---|---|
| 962,108 | 6/1910 | Weise et al. | 60/648 |
| 3,568,438 | 3/1971 | Metenberg | 60/649 X |

Primary Examiner—Allen M. Ostrager
Attorney, Agent, or Firm—Burton, Crandell & Polumbus

[57] ABSTRACT

Synthesis gas is produced, at moderate to high pressure, by reacting steam and oxygen with a solid carbonaceous material, and the gas is then saturated under pressure, with water obtained both from drying the carbonaceous material and from scrubbing the gas in aqueous solutions of alkali salts to remove impurities. The pressurized, water saturated synthesis gas is then cooled and dried by passing it through an expansion turbine, followed by a condensor of the tube and shell type. The expansion turbine is mechanically coupled to one or more rotary compressors, which recompress the noncondensable components of the synthesis gas stream passing through the condensor to a pressure suited for subsequent catalytic synthesis of methanol, methane or ammonia. Work extracted from the moist synthesis gas stream by the expansion turbine, is used for recompressing the dry synthesis gas, for compressing air for manufacturing oxygen used in the synthesis gas generator, or for producing an electric current or other purpose.

4 Claims, 1 Drawing Figure

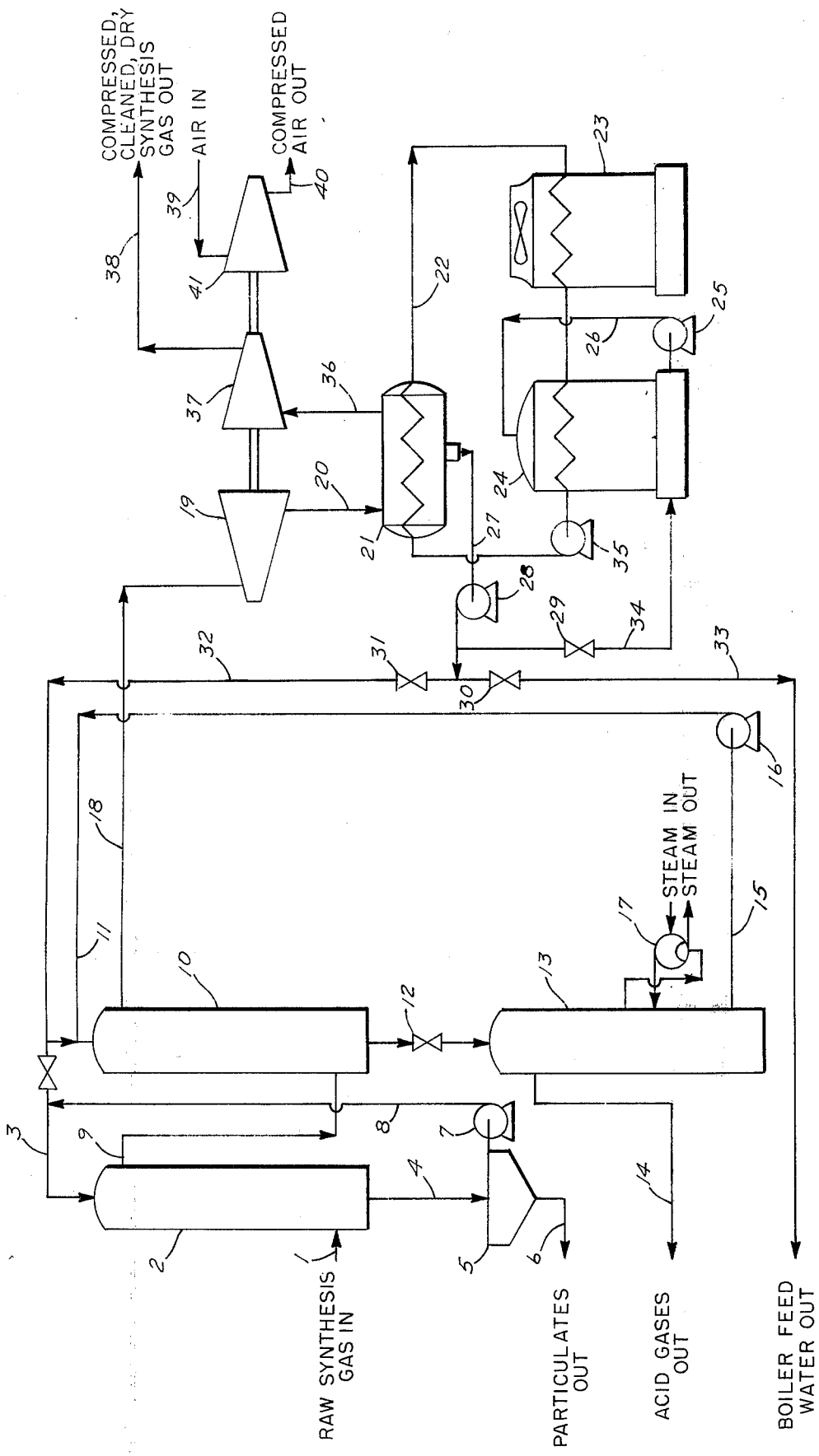

PROCESS FOR EXTRACTING WATER AND ENERGY FROM SYNTHESIS GAS

FIELD OF THE INVENTION

The present invention relates to the synthesis of methanol, methane or ammonia and the like from synthesis gas, which gas is composed primarily of carbon oxides and hydrogen for use in the preparation of methanol and methane, and includes the addition of nitrogen gas for the synthesis of ammonia. The subject matter of the present invention is a method of conditioning and pressurizing the synthesis gas which is produced by reacting solid carbonaceous material with steam and oxygen bearing gas under pressure, and simultaneously extracting work from the steam of raw synthesis gas.

PRIOR ART

The manufacture of synthesis gas from solid carbonaceous matter is an ancient and well known art. A discussion of part technology for the gasification of coal, for example, may be found in Perry, "The Gasification of Coal" Scientific American, Vol. 230, No. 3, Pages 19–25, March, 1974. See also U.S. Pat. No. 3,677,727, issued July 18, 1972, to A. Godel for "Process of Activation and Gasification of Fluidised Carbonaceous Materials."

The synthesis gas produced from most solid carbonaceous materials, such as coal, contains gaseous sulfur compounds which must be removed before the synthesis gas can be passed over catalysts in pressurized reactors to produce methanol, methane or ammonia. Also, the excess carbon dioxide is conventionally removed to reduce the reaction of hydrogen with oxygen in the catalytic converter to produce unwanted water with the particular synthesis product. These gases can be removed, while maintaining high temperature and pressure in the synthesis gas, by scrubbing with a hot potassium carbonate solution, as taught in Kohl and Riesenfeld, "Gas Purification," McGraw-Hill, 1960, Pages 137–150. The use of expansion turbines to extract energy in the form of useful mechanical work from hot, pressurized gas and from steam is well known. The synthesis of methanol, methane and higher molecular weight organic products by catalytic reaction of hydrogen and carbon oxides under high pressures is well developed technology, as is the synthesis of ammonia from hydrogen produced in a synthesis gas generating system and nitrogen derived from separation of air.

The steam-carbon reaction to produce hyrogen and carbon monoxide, the basic compounds is synthesis gas, proceeds rapidly above a temperature of approximately 1400°F. The synthesis gas must be cleaned of compounds of sulfur which poison and render ineffective the catalysts employed in the synthesis of methanol, methane, and ammonia and the like. The synthesis gas must also be cooled and dried for best results in the catalytic converters. Finally, the cleaned, dried and cooled synthesis gas must be compressed to a pressure exceeding 50 atmospheres for methanol synthesis, or 100 atmospheres for ammonia synthesis. Methane synthesis may be carried out at pressures from 1 to 250 atmospheres.

In a typical system using the prior art as represented by the Lurgi Mineraloetechnik G.m.b.H. process utilized to produce synthesis gas from coal at the SASOL plant in South Africa, the coal is first dried, then reacted with steam and oxygen in a pressurized countercurrent shaft kiln to produce a hot synthesis gas. The hot gas may then be cooled by passing it through a waste-heat boiler to raise steam and then cooling it in a condenser or heat exchanger where the excess is condensed. The condenser or heat exchanger may be coupled to a cooling tower where the heat is dissipated and lost. The gas is then cleaned of impurities and compressed for the synthesis unit.

OBJECTS OF THE INVENTION

The principal object of the present invention is to substantially improve the energy utilization efficiency of the gasification system and to recover and recycle the moisture contained in the solid carbonaceous feedstock.

Another object of this invention is to utilize efficiently the sensible heat in the synthesis gas which is at a temperature in excess of 1,400°F when it exits the synthesis gas processing zone.

A further object of the invention is to extract the latent work energy from the synthesis gas stream.

DESCRIPTION OF THE DRAWING

The single FIGURE of the drawing is a schematic flow diagram of the process embodying the present invention.

SUMMARY

In accordance with the foregoing objects, synthesis gas, produced at moderate to high pressure by reacting steam and oxygen with a solid carbonaceous material, is saturated under pressure with water, obtained from drying the carbonaceous material, and scrubbed in water and aqueous solutions of alkali salts to remove impurities. The pressurized, saturated synthesis gas is then cooled and dried by passing it through an expansion turbine followed by a condensor of the tube and shell type. The expansion turbine is mechanically coupled to one or more rotary compressors, one of which recompresses the noncondensable components of the synthesis gas stream passing through the condensor to a pressure suited for subsequent catalytic synthesis of methanol, methane or ammonia. Excess work extracted from the moist synthesis gas stream by the expansion turbine, not needed for recompressing the dry synthesis gas, is used to compress air for manufacturing oxygen used in the synthesis gas generator or for other purposes such as producing an electric current.

DESCRIPTION OF THE INVENTION

Referring to the drawing, a raw synthesis gas stream 1 containing carbon oxides, hydrogen, methane, steam, and gaseous sulfur compounds, with or without substantial amounts of nitrogen, at a pressure between 200 and 2,000 psi, and at a temperature above the dew point of the water contained therein, is first scrubbed in a water scrubber 2 to remove remaining particulate matter in the stream. The gas is scrubbed with a water stream 3 which is composed of a recycle water stream 8 and a makeup stream 32 which is water condensed from the synthesis gas stream downstream from the scrubber. The scrubbing water, containing the particulates removed from the gas, exits as a stream 4 into a settling tank 5. A concentrated particulate mud leaves the settling tank 5 as a stream 6, and is returned to the synthesis gas producer, not shown, for further gasification. The overflow from the settling tank 5 is recirculated in the scrubber 2 by a circulating pump 7.

A saturated gas stream 9 exits the water scrubber 2 and enters a potassium carbonate $K_2CO_3$ scrubber 10, where the acid gases, carbon dioxide, hydrogen sulfide, and carbonyl sulfide, are absorbed in the hot potassium carbonate solution 11. The pregnant potassium salt solution exits the scrubber 10 through a let-down valve 12 to a flash tank and stripper vessel 13, where the acid gases absorbed in the solution are released at atmospheric pressure and exit as a stream 14 to a Klaus sulfur plant, not shown, for sulfur recovery. Heat for stripping the gases from the solution is provided by circulating a stream from the stripper vessel 13 through an external heater 17. The purged potassium carbonate solution from the stripper vessel 13 exits as a stream 15 and is repressured by a pump 16 for circulation back to the $K_2CO_3$ scrubber 10 as a stream 11.

The cleaned, saturated synthesis gas stream exits the $K_2CO_3$ scrubber 10 as a stream 18. It is composed primarily of carbon monoxide, hydrogen, methane and water vapor, with or without substantial amounts of nitrogen. This stream 18, still under a pressure of between 200 and 2,000 psia, is then expanded through an expansion turbine 19 from which it exits as a stream 20 and passes to a tubular condenser 21, which is indirectly cooled by a water stream 22. The water vapor in the synthesis gas stream 20 is condensed in a tubular condenser 21 and the free energy change is extracted as work in the expansion turbine 19. The expansion of the noncondensable gasses in the synthesis gas stream 18 in expansion turbine 19 also contributes to the work and cools the noncondensable gasses flowing in stream 20, to a tubular condenser 21.

The condensed pure water from the tubular condenser 21 exits as stream 27, and is pressurized by a pump 28. This water stream is distributed by valves 20, 30 and 31 into a stream 33 which is sent to the steam plant, not shown, for use as boiler feed water, a stream 32 as makeup water for the scrubber circuits, and a stream 34 for use in an evaporative cooler 24 to complete the cooling of the circulating water stream 22. The evaporative cooler water from stream 34 is circulated by a pump 25 as a stream 26. An air cooler 23 removes most of the tubular condenser heat by first cooling the circulating stream 22, which stream is circulated through the evaporative cooler 24 and then the tubular condenser 21, by a pump 35.

The cooled, dry synthesis gas stream exits from the tubular condenser 21, as a stream 36 which is recompressed to between 200 and 2,000 psia by rotary compressors 37 which are directly coupled to the turbine 19, and then sent as a stream 38 to the catalytic converters, not shown, where it is converted to methanol, methane or ammonia or mixtures of these gasses. Excess work extracted by the expansion turbine 19 is utilized to compress a stream of air 39, by means of rotary compressors 41 also directly coupled to the turbine 19, to a compressed air stream 40 which is utilized as feedstock for an air separation plant (not shown) for the production of oxygen and nitrogen streams.

As can be readily seen from the foregoing, the sensible heat in the sythesis gas, which is at a temperature in excess of 1400°F when it exits the synthesis gas processing zone, is efficiently utilized to dry the incoming carbonaceous material. Accordingly, the invention works best on a lignite or high moisture coal or solid waste feed, since the high moisture content of the feed will yield enough water vapor to cool the synthesis gas to the saturation temperature at the pressure maintained in the system. In the scrubbing, with water and hot potassium carbonate solutions, to remove particulate solids carried out of the gasifier system as well as the gaseous sulfur compounds and excess carbon dioxide produced in the gasifier, the absorption of the gaseous impurities in the scrubbing medium is exothermic and the exothermic heat released is used to produce more steam from the scrubbing solution for subsequent addition to the synthesis gas stream. Further, the work extracted from the steam content of the synthesis gas stream is utilized to compress the dry, cleaned gas for feeding the catalytic converters used to produce methanol, methane or ammonia. This work is also utilized to accomplish the air compression requirement for producing oxygen and nitrogen in an air separation plant, which products are needed in the processing plant complex.

When the process of this invention is utilized with a synthesis gas manufacturing process such as the one taught in co-pending patent application Ser. No. 490,774, filed July 22, 1974, for "Process for Gasifying Carbonaceous Matter," it is possible to derive substantially all of the water needed for producing steam for the gasification process from a wet lignite or coal feed material such as is prevalent in the western United States. This is of great benefit to the utilization of these coal deposits, since surface water is generally in short supply in these areas. Also, since the sensible heat in the synthesis gas is used to make steam in direct contact with the coal moisture and the scrubbing towers, and this steam is utilized to drive the major compressors needed in the plant, maximum utilization of the fuel value in the solid carbonaceous matter which is used to make the synthesis gas is accomplished and the overall energy consumption is minimized.

While a certain illustrative process embodying the present invention is shown in the drawing and described above in considerable detail, it should be understood that there is no intention to limit the invention to the specific form disclosed. On the contrary, the intention is to cover all modifications, alternating forms, equivalents and uses of the present invention falling within the spirit and scope of the appended claims.

I claim:

1. A process for extracting water and work from a conditioned, hot, moisture laden synthesis gas stream produced from solid carbonaceous matter and for pressurizing the dried synthesis gas for use in the catalytic synthesis of methanol, methane or ammonia, consisting of the sequential steps of:
    a. cleaning the conditioned synthesis gas stream, under pressure, by scrubbing it with water and a solution of hot alkali salt;
    b. passing said cleaned and water-saturated pressurized synthesis gas stream through an expansion turbine followed by a condenser;
    c. extracting work from said expansion turbine by direct coupling of said turbine to one or more rotary compressors,
    d. extracting water from the condenser for use as boiler feedwater and cooling water, and
    e. compressing the dried synthesis gas by utilizing a portion of the work extracted in the expansion turbine.

2. In a process for preparing synthesis gas derived from the gasification of carbonaceous material for use in the preparation of methane, methanol or ammonia, wherein the synthesis gas produced from the gasification process contains carbon oxides, hydrogen, methane, steam and gaseous sulfur compounds, at a pressure between 200 and 2,000 psi, and at a temperature above the dew point of the contained water, the improvement consisting of the sequential steps of:
- a. scrubbing the synthesis gas with water and a hot alkali salt solution;
- b. expanding said scrubbed synthesis gas through an expansion turbine coupled to a compressor;
- c. condensing and removing water from the expanded synthesis gas;
- d. and compressing the dried, expanded, synthesis gas in said compressor.

3. The process defined in claim 2 wherein said alkali salt solution is a potassium carbonate solution.

4. The process defined in claim 2 wherein said dried expanded synthesis gas is compressed to a pressure of between about 200 psi and about 2,000 psi.

* * * * *